United States Patent
Segel et al.

[15] 3,669,000
[45] June 13, 1972

[54] CELLULOSE ETHER FOAM STABILIZERS FOR MALT BEVERAGES

[72] Inventors: Edward Segel, Chevy Chase, Md.; Kenneth G. Scheffel, Midland, Mich.

[73] Assignees: The Dow Chemical Company, Midland, Mich.; Miles Laboratories, Inc., Elkhart, Ind.; part interest to each

[22] Filed: Sept. 4, 1969

[21] Appl. No.: 855,275

[52] U.S. Cl. ............................................................ 99/48
[51] Int. Cl. ......................................................... C12h 1/14
[58] Field of Search .......................... 99/31, 48; 260/231, 215

[56] References Cited

UNITED STATES PATENTS

| | | |
|---|---|---|
| 2,588,379 | 3/1952 | Frieden et al. ............................. 99/48 |
| 3,357,971 | 12/1967 | Klug ....................................... 260/215 |
| 3,448,100 | 6/1969 | Callihan et al. ......................... 260/231 |
| 3,526,510 | 9/1970 | Raymond et al. .......................... 99/48 |

Primary Examiner—A. Louis Monacell
Assistant Examiner—D. M. Naff
Attorney—Griswold and Burdick and D. B. Kellom

[57] ABSTRACT

$C_3$–$C_4$ Hydroxyalkyl carboxymethyl cellulose ethers having a $C_3$–$C_4$ hydroxyalkyl MS of at least about 1.2 and a carboxymethyl DS of about 0.2–0.6 are superior cellulose ether foam stabilizers for carbonated malt beverages. They are compatible with chemical pasteurizing agents and can be used to improve the foam properties of beverages so treated.

14 Claims, 1 Drawing Figure

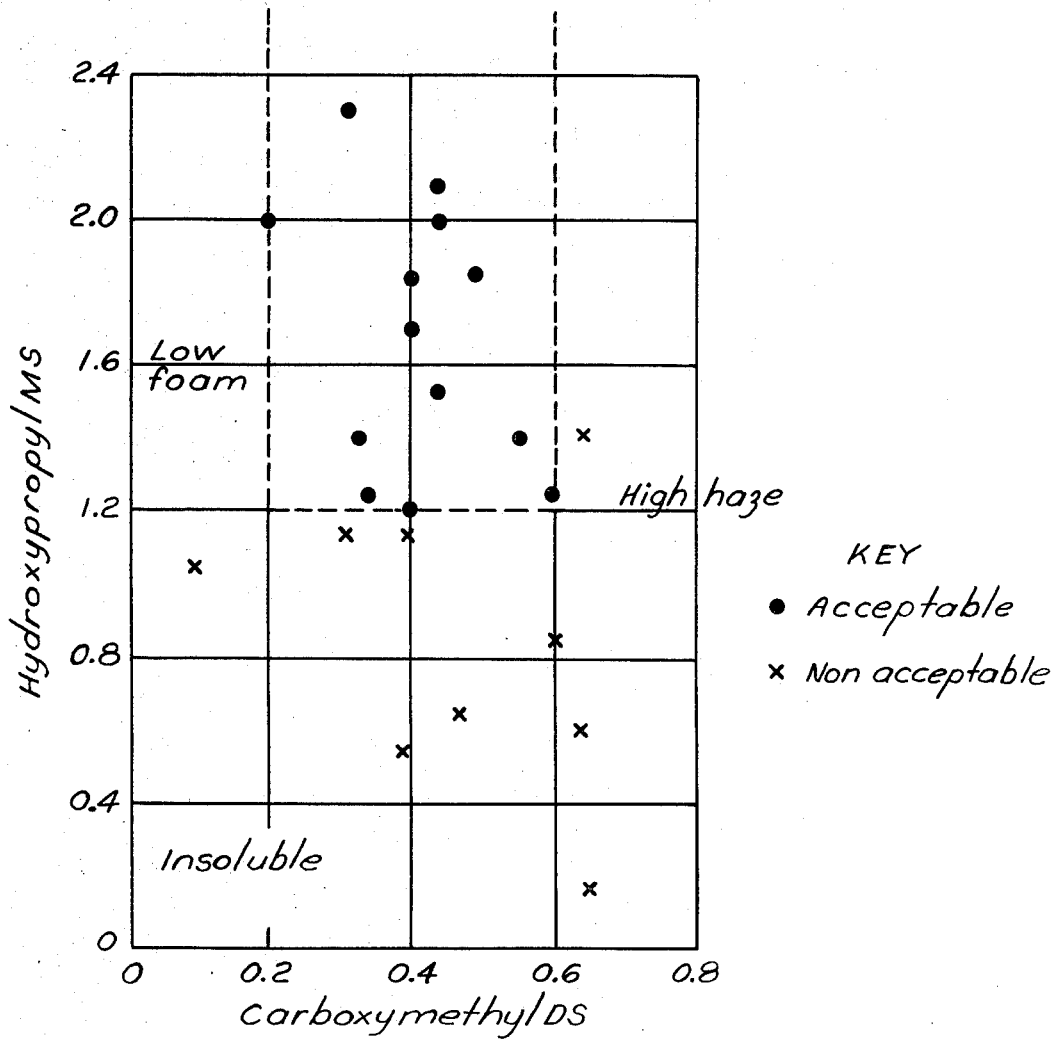

3,669,000

CELLULOSE ETHER FOAM STABILIZERS FOR MALT BEVERAGES

BACKGROUND

The importance of an attractive long-lasting head of foam and sparkling liquid clarity in augmenting the aesthetic appeal of a glass of beer or other malt beverage is well recognized. The foamy head on a cool glass of beer is a time honored characteristic that distinguishes beer from other beverages. Another related aesthetic factor is the foam adhesion or "cling" of the material deposited on the wall of the drinking glass as the glass is emptied and the beer foam collapses. This deposit is generally in the form of a network varying from a scanty irregular webbing to a uniform heavy lacework. For many, a beer with a dense uniform cling not only has great appeal but is also considered satisfactorily balanced in its components.

The need for more effective foam stabilizers in the brewing industry has become more apparent in recent years with the increasing use of certain types of hop extracts and chemical pasteurizing compounds. The latter involves addition of chemical fungicides and bacteriocides to control microbiological growth in finished malt beverage as described, for example, by Strandskov and Bockelmann, U.S. Pat. No. 3,175,912. Both of these processing changes, however, may decrease the natural foam of the finished beer.

Although many materials have been suggested as beer foam stabilizers, commercial success requires a stabilizer that is fully compatible with the complex colloid system of these beverages. An effective stabilizer should not detract from the brilliance of the beverage, impair its cling, or decrease its shelf stability through gradual formation of turbidity and haze or deposition of sediment. Since the composition of the colloidal system differs from batch to batch because of minor variations in raw materials and the brewing process, the stabilizer must itself be uniform in quality and sufficiently active to compensate for normal product variations.

The general concept of using cellulose derivatives as foam stabilizers for aqueous systems is old. For example, Frieden U.S. Pat. Nos. 2,588,378 and 2,588,379 employ carboxymethyl hydroxyethyl cellulose ethers to stabilize foams in aqueous liquids including beer. Advantages of hydroxypropyl methyl cellulose ether beer foam stabilizers are described in Weaver and Greminger, U.S. Pat. No. 2,712,500. Shaler and McAdam, U.S. Pat. No. 3,293,040 describes a combination of a water-soluble cellulose ether and certain clays in a chill-proof treatment of beer.

Yet in practice, despite repeated trials no brewery has been able to use a cellulose ether as a foam stabilizer on a regular production basis. Inconsistent performance and erratic side effects have prevented general commercial use. The cellulose derivatives that have been tried lack the requisite balance of physical and chemical properties necessary for both improved foam stability and consistent compatibility.

STATEMENT OF THE INVENTION

We have discovered that certain $C_3-C_4$ hydroxyalkyl carboxymethyl cellulose ethers are superior additives for improving the foam and haze stability as well as the cling of fermented malt beverages. Furthermore these particular cellulose ethers not only readily disperse in the malt beverages under normal processing conditions, but also they are compatible with and effective in combination with chemical pasteurizing agents such as n-heptyl p-hydroxybenzoate and octyl gallate.

More specifically, this invention is a process for preparing a carbonated malt beverage with improved foam characteristics resulting from the addition of a water-soluble $C_3-C_4$ hydroxyalkyl carboxymethyl cellulose having a $C_3-C_4$ hydroxyalkyl MS of at least about 1.2 and a carboxymethyl DS of about 0.2–0.6. Preferably the cellulose foam stabilizer is a hydroxypropyl carboxymethyl cellulose with a hydroxypropyl MS of about 1.2–2.5, and a carboxymethyl DS of about 0.3–0.5.

The resulting treated beverages have demonstrated increased foam stability and cling as well as desired liquid clarity in tests with many batch and brand variations in beer composition. The process is particularly suited for improving the foam of unpasteurized beers containing a chemical pasteurizing agent to control microbiological growth.

GENERAL DESCRIPTION

This process is useful with carbonated alcoholic and non-alcoholic fermented malt beverages including, for example, beer, ale, stout, porter, lager and near-beer. The term "beer" is used to encompass all such carbonated malt beverages.

CELLULOSE ETHERS

The essential process element is the use of particular water-soluble cellulosic ethers having a balance of nonionic $C_3-C_4$ hydroxyalkyl and anionic carboxymethyl groups as determined after extensive research and testing. The compatibility of the improved foam stabilizers with the complex aqueous beer colloid system depends on the specific substitution of the cellulose ether. Thus the suitable ethers have a $C_3-C_4$ hydoxyalkyl molar substitution (MS) of at least about 1.2 and a carboxymethyl degree of substitution (DS) of about 0.2–0.6. Preferred are hydroxypropyl carboxymethyl cellulose ethers with a hydroxypropyl MS of about 1.2–2.5 and a carboxymethyl DS of about 0.3–0.5.

Such hydroxyalkyl carboxymethyl cellulose ethers are prepared by standard methods. Thus they can be prepared by propylene oxide or butylene oxide hydroxyalkylation of a carboxymethyl cellulose having the requisite carboxymethyl DS. Alternately, finely divided alkali cellulose can be reacted in one stage with a mixture of sodium chloroacetate or chloroacetic acid and a $C_3-C_4$ alkylene oxide, or in a separate two stage reaction. The organic diluent slurry process of Klug, U.S. Pat. Nos. 2,618,632 and 3,357,971 can be used as well as other dry and aqueous cellulose ether processes. Optimum results are obtained with a fairly uniform distribution of the substituent hydroxyalkyl and carboxymethyl groups in the cellulose ether.

The molecular weight of the cellulose ether as shown by the standard 2 percent aqueous solution viscosity at pH 7.0 and 20° C in the range from about 20–8,000 cps does not appear critical for foam stabilization. At the low concentrations required, the cellulose ethers readily disperse in the beer without significant effect on its processability.

PROCESSING

Effective foam stabilization requires a cellulose ether concentration of about 10–200 parts per million (ppm), preferably about 20–80 ppm. Some improvement is noticeable at concentrations as low as 5 ppm. Concentrations higher than 200 ppm can be used, but the benefits are not commensurate with the added cost.

The point of addition of the cellulose ether foam stabilizer after fermentation is not critical. However, it is preferably added as an aqueous solution during the final processing before customer packaging. For example, it can be injected into the beer transfer line after primary filtration, after the finish stage but before final filtration, or after final filtration depending on the process requirement of a particular plant.

Until recently, packaged beer was generally heat pasteurized to prevent microbiological growth. However, chemical pasteurizing agents are now being used by many brewers to control the bacteria and fungi during storage prior to consumption. Tests with two commercial bacteriocides, n-heptyl p-hydroxybenzoate and octyl gallate, indicate that the improved cellulose ether stabilizers described herein enhance the foam properties of beers containing such antimicrobial agents and are fully compatible in other properties. Indeed it has been found that use of these hydroxyalkyl carboxymethyl cellulose ethers also improves the chill haze stability of beer treated with n-heptyl p-hydroxybenzoate.

The following examples illustrate further the present invention and its advantages. Unless otherwise specified all parts and percentages are by weight.

EXAMPLE 1

Hydroxypropyl Carboxymethyl Cellulose Ethers (HPCMC)

A. To an alkali cellulose slurry prepared from 107 parts (0.66 mole) of finely divided cellulose, 169 parts (1.86 mole) of 44 percent aqueous NaOH and 1,070 parts t-butyl alcohol was added 48 parts (0.38 mole) of 75 percent aqueous chloroacetic acid. Then the mixture was gradually heated with agitation and a nitrogen purge to 70° C over a period of about 2 hours. The reactor was cooled, 198 parts (3.40 mole) of propylene oxide added, and then heated at 70° C for 4 hrs. The product was precipitated at pH 3, filtered, and washed with aqueous acetone to remove by-product salts. A slurry of the purified ether was neutralized with caustic to an aqueous solution pH of 7.0–8.0 and the hydroxypropyl carboxymethyl cellulose in sodium salt form recovered, dried, and ground to a fine powder.

By analysis this water-soluble ether had a hydroxypropyl MS of 1.70, a carboxymethyl DS of 0.40, and a 2 percent aqueous solution viscosity at pH 7.0 and 20° C of 127 cps.

B. In another run 200 pts (1.23 mole) of finely divided cellulose was blended and spray treated with 280 pts (3.50 mole) 50 percent NaOH and 210 pts (1.33 mole) 60 percent chloroacetic acid. The mixture was heated to 50°–60° C in 1 hr., cooled, and 460 pts (7.93 mole) propylene oxide added. After further heating at about 50° C for 3 hrs and then briefly at 75° C, the reaction product was neutralized with acetic acid, washed, and dried. It had a hydroxypropyl MS OF 1.52, a carboxymethyl DS of 0.43, and a 2 percent aqueous solution viscosity in Na salt form at pH 7.0 and 20° C of 1,580 cps.

C. In another run under similar conditions, a hydroxypropyl cellulose ether was prepared by reacting alkali cellulose with propylene oxide to a hydroxypropyl MS of 1.4. Then the hydroxypropyl cellulose was carboxymethylated by reaction with sodium chloroacetate to give a mixed cellulose ether with a carboxymethyl DS of 0.55 and a 2 percent viscosity at pH 7.0 and 20° C of 11 cps.

EXAMPLE 2

Foam Stabilizer Tests

Initial tests were made by adding 40 ppm of the hydroxypropyl carboxymethyl cellulose ethers as an aqueous solution to retail bottles of commercial beer. The bottles were chilled to 5° C and visually examined for haze. Then the foam properties were determined by pouring the treated beer into clean glasses and measuring the foam height and collapse rate. At the same time the foam cling and creaminess is visually rated. Subsequently the better additives were tested further in pilot plant brews with the cellulose ether being added prior to final filtration before bottling. Foam stability was measured both by the poured glass method and by the Sigma Test method of the American Society of Brewing Chemists.

A. Typical test results are shown in Table 1 for two hydroxypropyl carboxymethyl ethers prepared by the general process of Example 1B. As a test standard, a commercial hydroxypropyl alginate foam stabilizer described by Steiner, U.S. Pat. No. 2,659,675 was used.

TABLE 1

Foam Stability

| Test | Additive[a] | Σ | Collapse, min. | Cling[b] |
|---|---|---|---|---|
| 2A–1 | None | 109 | 6:10 | E |
| 2A–2 | 40 ppm Kelcoloid L | 118 | 6:38 | VG+ |
| 2A–3 | 40 ppm HPCMC–2.1 | 121 | 6:36 | E |
| 2A–4 | 40 ppm HPCMC–2.2 | 124 | 6:43 | E | a. Kelcoloid L; hydroxypropyl alginate from Kelco Co. HPCMC–2.1: 2.0 HP + 0.43 CM HPCMC–2.2: 1.4 HP + 0.43 CM
b. E—Excellent; VG—Very Good B. As a further test of haze stability, bottled samples of beer containing the cellulose ether additives were chilled overnight at 0° C and then warmed to 75° F (23.9° C). The haze was measured visually and with a standard Helm Haze Meter (from Radiometer of Denmark). In an accelerated stability test the bottled beer was stored at 105° F (40.6° C) with periodic haze determination. Typical results using the cellulose ether of Example 1A (HPCMC–1A) and two different commercial beers are given in Table 2.

TABLE 2

Helm Haze Stability

| Test | Additive | Beer A Init. | 25 day/40°C | Beer B Init. | 25 day/40°C |
|---|---|---|---|---|---|
| 2B–1 | None | 17 | 162 | 44 | 170 |
| 2B–2 | 40 ppm Kelcoloid L | 20 | 230 | 63 | 155 |
| 2 B–3 | 40 ppm HPCMC–1A | 17 | 145 | 46 | 155 |

Visual observation of beer treated with HPCMC–1A confirmed its effectiveness as a beer foam stabilizer giving a highly desirable creamy, clinging foam coupled with a clarity and freedom from haze development superior in uniform performance to previously available cellulose ethers.

EXAMPLE 3

Evaluation of Cellulose Ether Foam Stabilizers

Foam properties have long been an important aspect of selling beer. To meet the increased emphasis on this "eye appeal" factor, more effective foam stabilizers are required. In screening potential stabilizers, four major factors are given primary consideration:

Haze is measured both by visual observation of a skilled technician and by a Helm Haze Meter which determines the ratio of reflected light to transmitted light on a scale of 0–500 units with higher reading indicating hazier beer.

Collapse Time and Collapse Rate are measured by pouring chilled beer (5° C) into a clean 8 oz glass under controlled conditions and measuring the foam height and collapse time. Brewers generally seek a glass collapse time greater than 240 sec.

Cling is determined by visual observation of a skilled technician after the collapse of the initial foam head.

In a refined foam stability test, a bottle of chilled beer is smoothly poured down the side of a standard glass funnel (500 ml capacity with 145 mm top diameter) and into the middle of a clean 1,000 ml graduate having a diameter of about 60 mm. The volume of liquid beer and of beer foam is measured at precise 1 minute intervals after the beer drains from the funnel for 5 minutes. Also the total collapse time when the beer surface is visible through the foam when viewed from above measured. The rating is then calculated from the formula:

Rating = $(A_1/C_1 + A_2/C_2 + A_3/C_3 + A_4/C_4 + A_5/C_5) \times 1,000/5T$ where $A$ is the beer volume at the subscript time interval, $C$ is the foam volume at the subscript time interval, and $T$ is the total collapse time.

A rating of 0–20 is excellent, 21–30 very good, 31–40 good, 41–50 fair, and > 50 poor.

The typical test results given in the following tables were obtained from screening tests with bottled commercial beer and from pilot plant brews in which the additive is incorporated in the transfer line just prior to final filtration. All tests were run with appropriate controls and replicates with a commercial hydroxypropyl alginate as a standard stabilizer.

A. Cellulose Ether Substitution

A preliminary definition of the substitution range for hydroxypropyl carboxymethyl cellulose ethers was obtained from haze measurements with retail bottled beer. Foam stability measurements were made on materials passing the haze test.

Typical results given in Table 3 and shown in the FIGURE establish an operable hydroxypropyl MS above about 1.2 and a carboxymethyl DS of about 0.2–0.6. Hydroxybutyl derivatives are similar.

Table 3

Hydroxypropyl Carboxymethyl Cellulose Ethers (HPCMC)

| Test[a] | Additive[b] | Haze | Collapse, min | Rating[c] |
|---|---|---|---|---|
| 3–1.0 | Control | 25 | — | — |
| 3–1.1 | Kelcoloid L | 65 | — | A |
| 3–1.2 | 1.05 HP + 0.1 CM | 125 | — | NA |
| 3–1.3 | 1.14 HP + 0.32 CM | 170 | — | NA |
| 3–1.4 | 1.4 HP + 0.33 CM | 61 | — | A |
| 3–1.5 | 0.54 HP + 0.38 CM | 314 | — | NA |
| 3–1.6 | 1.14 HP + 0.39 CM | 241 | — | NA |
| 3–1.7 | 1.2 HP + 0.4 CM | 97 | — | A |
| 3–1.8 | 0.64 HP + 0.46 CM | 295 | — | NA |
| 3–1.9 | 0.86 HP + 0.6 CM | >500 | — | NA |
| 3–2.0 | Control | 22 | 5:24 | — |
| 3–2.1 | Kelcoloid L | 27 | 6:50 | A |
| 3–2.2 | 1.84 HP + 0.4 CM | 33 | 6:08 | A |
| 3–2.3 | 1.52 HP + 0.43 CM | 42 | 5:23 | A |
| 3–2.4 | 2.1 HP + 0.44 CM | 32 | 5:55 | A |
| 3–2.5 | 1.26 HP + 0.6 CM | 37 | 5:42 | A |
| 3–3.0 | Control | 38 | 5:24 | — |
| 3–3.1 | Kelcoloid L | 49 | 6:50 | A |
| 3–3.2 | 0.6 HP + 0.64 CM | 210 | 7:34 | NA |
| 3–3.3 | 1.25 HP + 0.34 CM | 42 | 7:05 | A |
| 3–3.4 | 1.4 HP + 0.55 CM | 48 | 6:52 | A |
| 3–3.5 | 1.4 HP + 0.64 CM | 350 | 7:25 | NA |
| 3–4.0 | Control | 24 | 6:08 | — |
| 3–4.1 | Kelcoloid L | 75 | 7:44 | A |
| 3–4.2 | 0.17 HP + 0.64 CM | >500 | 7:20 | NA |
| 3–4.3 | 0.35 HP + 0.64 CM | >500 | 6:41 | NA |
| 3–4.4 | 0.24 HP + 0.73 CM | >500 | 7:15 | NA |
| 3–4.5 | 2.3 HP + 0.31 CM | 28 | 6:19 | A | a. Additive conc.–40 ppm
b. HPCMC—hydroxypropyl (MS), carboxymethyl (DS)
c. A—Acceptable, NA - not Acceptable B. Further evidence useful in defining substitution limits for the improved cellulose ethers is given in Tables 4 and 5. Note that the nonionic ethers (HPMC and HEC) and also the hydroxyethyl carboxymethyl ethers (HECMC) are significantly less effective as foam stabilizer additives.

Similar tests with several HPCMC ethers having about 0.9–1.0 HP and 0.4 CM gave acceptable ratings with several but not all beers tested and were thus rated not acceptable for general use.

C. Typical results from foam collapse and cling tests using two different pilot plant beers and several additive concentrations are given in Table 7. Note that 40 ppm of HPCMC is as good as 60 ppm of the standard Kelcoloid L.

TABLE 4.—OTHER CELLULOSE ETHERS

| Test | Additive[a] | Substitution[b] | Haze | Collapse | Sec./cm. | Cling | Rating |
|---|---|---|---|---|---|---|---|
| 4–1.0 | Control | | 33 | 5:25 | 49.2 | G+ | |
| 4–1.1 | Kelcoloid L | | 45 | 6:08 | 58.4 | G+ | A |
| 4–1.2 | HPCMC | 2.0 HP+0.2 CM | 38 | 6:00 | 59.0 | G+ | A |
| 4–1.3 | HPCMC | 2.3 HP+0.31 CM | 35 | 6:00 | 60.0 | G+ | A |
| 4–1.4 | HPMC | 0.1 HP+1.6 Me | 42 | 5:43 | 54.5 | VG | NA |
| 4–1.5 | HEC | 1.8 HE | 38 | 5:39 | 53.0 | VG+ | NA | a 40 p.p.m.  b HP=hydroxypropyl; CM=carboxymethyl; Me=methyl; HE=hydroxyethyl.

TABLE 5.—OTHER CELLULOSE ETHERS

| Test | Additive[a][b] | Substitution[b] | Haze | Collapse | Sec./cm. | Cling | RFST[b] | Rating |
|---|---|---|---|---|---|---|---|---|
| 5–1.0 | Control | | 22 | 5:24 | 60 | F+ | 43 | |
| 5–1.1 | Kelcoloid L | | 27 | 6:50 | 68 | G+ | 17 | A |
| 5–1.2 | HECMC | 1.2 HE+0.6 CM | 52 | 6:26 | 80 | F+ | 32 | NA |
| 5–1.3 | HECMC | 1.1 HE+0.72 CM | 127 | 5:46 | 79 | G+ | 39 | NA |
| 5–1.4 | HPCMC | 1.05 HP+0.1 CM | 34 | 5:34 | 65 | G+ | 25 | NA |
| 5–1.5 | HPCMC | 1.26 HP+0.6 CM | 37 | 5:42 | 72 | VG | 20 | A |
| 5–1.6 | HPCMC | 1.52 HP+0.43 CM | 42 | 5:23 | 73 | VG | 37 | A |
| 5–1.7 | HPCMC | 1.84 HP+0.4 CM | 33 | 6:08 | 68 | VG+ | 18 | A |
| 5–1.8 | HPCMC | 2.0 HP+0.43 CM | 32 | 6:55 | 70 | G+ | 24 | A |
| 5–1.9 | HPCMC | 2.1 HP+0.44 CM | 32 | 5:55 | 65 | VG | 32 | A | a Kelcoloid—60 p.p.m.; Others—40 p.p.m.
b Refined Foam Stability Test.

TABLE 6.—OTHER CELLULOSE ETHERS

| Test | Additive[a] | Σ | Haze | Collapse | sec./cm. | Cling | Rating |
|---|---|---|---|---|---|---|---|
| 6–1.0 | Control | 109 | 34 | 6:01 | 76.9 | E | |
| 6–1.1 | Kelcoloid L | 117 | 38 | 6:24 | 79.3 | E | A |
| 6–1.2 | 2.0 HP+0.43 CM | 118 | 38 | 6:25 | 80.2 | E | A |
| 6–1.3 | 1.41 HP+0.43 CM | 122 | 34 | 6:29 | 81.0 | E | A |
| 6–1.4 | 1.84 HP+0.48 CM | 120 | 34 | 6:11 | 77.3 | E | A | a 40 p.p.m.

TABLE 7.—HPCMC CONCENTRATION

| Test | Additive a | Beer A Collapse | Beer A Cling b | Beer B Collapse | Beer B Cling b |
|---|---|---|---|---|---|
| 7-1.0 | Control | 5:37 | E- | 5:21 | G |
| 7-1.1 | 60 p.p.m. Kelcoloid L | 6:24 | VG | 5:58 | VG- |
| 7-1.2A | 20 p.p.m. HPCMC-7.1 | 5:42 | E | 5:39 | VG |
| 7-1.2B | 40 p.p.m. HPCMC-7.1 | 5:58 | E | 5:49 | VG |
| 7-1.2C | 60 p.p.m. HPCMC-7.1 | 6:00 | E | 5:55 | VG |
| 7-1.3A | 20 p.p.m. HPCMC-7.2 | 6:08 | E | 5:50 | VG |
| 7-1.3B | 40 p.p.m. HPCMC-7.2 | 6:16 | E- | 5:57 | VG |
| 7-1.3C | 60 p.p.m. HPCMC-7.2 | 6:27 | VG+ | 5:59 | VG | a HPCMC-7.1: 2.0 HP+0.43 CM; HPCMC-7.2: 2.0 HP+0.20 CM.
b E = Excellent, VG = Very Good, G = Good.

D. Data in Table 8 shows that use of n-heptyl p-hydroxybenzoate as a chemical pasteurizing agent as described in Strandskov and Bockelmann, U.S. Pat. No. 3,175,912 markedly alters and depresses the foam characteristics.

TABLE 8

Chemical Pasteurizing Additive

| Test | Additive a-c | Collapse | Sec/Cm | Cling |
|---|---|---|---|---|
| 8-1.0 | Control | 6:31 | 75.2 | VG+ |
| 8-1.1 | Kelcoloid L | 7:15 | 79.0 | VG+ |
| 8-1.2 | HPCMC — 8.1 | 7:12 | 78.5 | VG- |
| 8-1.3 | HPCMC — 8.2 | 7:10 | 75.4 | VG+ |
| 8-1.4 | HPCMC — 8.3 | 7:11 | 74.3 | E |
| 8-2.0 | WS-7 | 5:53 | 67.9 | VG- |
| 8-2.1 | WS-7 + Kelcoloid | 6:43 | 82.2 | G+ |
| 8-2.2 | WS-7 + HPCMC — 8.1 | 6:44 | 82.2 | G |
| 8-2.3 | WS-7 + HPCMC — 8.2 | 6:48 | 77.0 | G |
| 8-2.4 | WS-7 + HPCMC — 8.3 | 6:30 | 76.4 | VG- | a. Conc: Kelcoloid L, HPCMC - 40 ppm; WS-7 — 10 ppm.
b. HPCMC — 8.1: 2.0 HP + 0.43 CM HPCMC — 8.2: 1.41 HP + 0.43 CM HPCMC — 8.3: 1.84 HP + 0.48 CM
c. WS-7: n-heptyl p-hydroxybenzoate (Washine Chem. Corp., Lodi, N.J.)

These pilot plant tank treatment tests demonstrate the detrimental effect of n-heptyl p-hydroxybenzoate on the beer foam stability (Run 8-1.0 vs. Run 8-2.0) and utility of the cellulose ethers in restoring the desirable foam properties when used in combination with the alkyl p-hydroxybenzoate.

We claim:

1. In a process for treating a fermented malt beverage with a cellulose ether to increase its foam stability, the improvement which comprises adding to the beverage a water-soluble $C_3-C_4$ hydroxyalkyl carboxymethyl cellulose ether having a $C_3-C_4$ hydroxyalkyl MS of at least about 1.2 and a carboxymethyl DS of about 0.02–0.6.

2. The process of claim 1 where the hydroxyalkyl group is hydroxypropyl.

3. The process of claim 1 where the hydroxyalkyl group is 2-hydroxybutyl.

4. The process of claim 1 where the $C_3-C_4$ hydroxyalkyl MS is about 1.2–2.5.

5. The process of claim 1 were the cellulose ether has a hydroxypropyl MS of about 1.2–2.5 and a carboxymethyl DS of about 0.3–0.5.

6. The process of claim 1 where the cellulose ether has a viscosity of about 20–8,000 cps as a 2 percent aqueous solution at pH 7.0 and 20° C.

7. The process of claim 1 where about 10–200 ppm of the $C_3-C_4$ hydroxyalkyl carboxymethyl cellulose ether is added.

8. The process of claim 1 where the beverage contains a chemical pasteurizing agent.

9. The process of claim 8 where the pasteurizing agent is an alkyl p-hydroxybenzoate.

10. The process of claim 9 where the pasteurizing agent is n-heptyl p-hydroxybenzoate.

11. A fermented malt beverage having improved foam properties from the addition of a water-soluble $C_3-C_4$ hydroxyalkyl carboxymethyl cellulose ether having a $C_3-C_4$ hydroxyalkyl MS of at least about 1.2 and a carboxymethyl DS of about 0.2–0.6.

12. The beverage of claim 11 containing as a foam stabilizer about 10–200 ppm of hydroxypropyl carboxymethyl cellulose ether having a hydroxypropyl MS of about 1.2–2.5 and a carboxymethyl DS of about 0.3–0.5.

13. A finished beer having improved microbiological stability and foam properties from the addition of a chemical pasteurizing agent and a $C_3-C_4$ hydroxyalkyl carboxymethyl cellulose ether having a $C_3-C_4$ hydroxyalkyl Ms of at least about 1.2 and a carboxymethyl DS of about 0.2–0.6.

14. The beer of claim 13 containing a microbiological growth inhibiting amount of n-heptyl p-hydroxybenzoate and about 10–200 ppm of a hydroxypropyl carboxymethyl cellulose ether having a hydroxypropyl MS of about 1.2–2.5 and a carboxymethyl DS of about 0.3–0.5.

* * * * *